United States Patent [19]
Hikata et al.

[11] Patent Number: 6,040,083
[45] Date of Patent: Mar. 21, 2000

[54] ALKALINE DRY CELL CONTAINING A CAN OF NICKEL-PLATED STEEL HAVING AN INNER SURFACE OF GRAPHITE

[75] Inventors: Seiichi Hikata, Annaka; Natsuki Toyota, Takasaki, both of Japan

[73] Assignee: Toshiba Battery Co., Ltd., Tokyo, Japan

[21] Appl. No.: 09/050,804

[22] Filed: Mar. 31, 1998

[30] Foreign Application Priority Data

Apr. 4, 1997 [JP] Japan ................................. 9-086677

[51] Int. Cl.[7] .................................................. H01M 2/02
[52] U.S. Cl. ........................ 429/169; 429/164; 429/166; 429/176
[58] Field of Search .................................. 429/163, 164, 429/166, 168, 169, 176

[56] References Cited

U.S. PATENT DOCUMENTS 5,792,553   8/1998   Moriyama et al. ...................... 428/323

FOREIGN PATENT DOCUMENTS 42-25145   12/1942   Japan .
46-8743    3/1971    Japan .
2-98037    4/1990    Japan .

*Primary Examiner*—Maria Nuzzolillo
*Assistant Examiner*—Monique M. Wills
*Attorney, Agent, or Firm*—Oblon, Spivak, McClelland, Maier & Neustadt, P.C.

[57] ABSTRACT

An object of the present invention is to improve the alkaline dry cell performance by modifying a positive cell case. An alkaline dry cell comprises a can as both of a terminal and a cell case 1 for accommodating a power generating element, prepared by drawing processing of a cold rolled steel material preliminarily applied with nickel-plating on both sides so as to form a can, having a conductive film formed in an inner surface portion contacting with a positive electrode compound, wherein the area of the portion with the conductive film is in the range of 75% to 90% with respect to the area of the whole portion contacting with the positive electrode compound in the inner surface. Since the conductive film is provided, the increase of the contact resistance can be prevented so as to improve the short-circuit current and the storage property. With less than 75% conductive film area, the above-mentioned effect cannot be achieved sufficiently. On the other hand, with more than 90% area, the filler compound can be separated in the dry cell production. Therefore, the above range is appropriate.

12 Claims, 2 Drawing Sheets

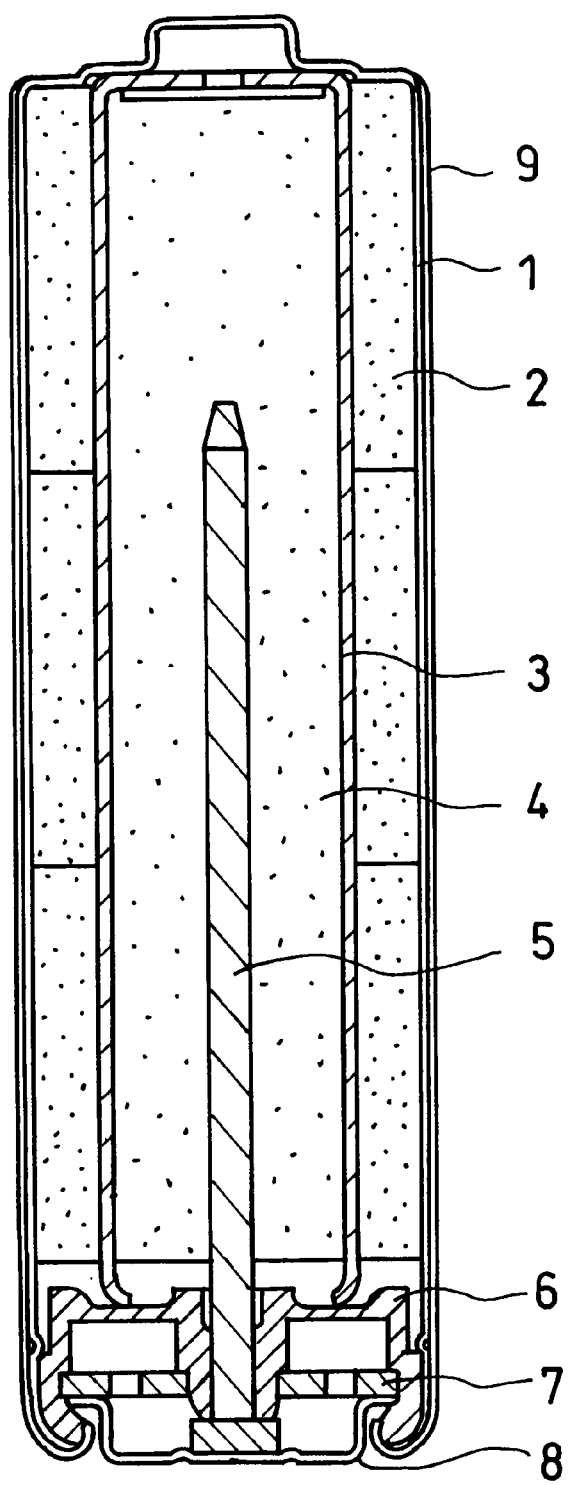
F I G. 1

ALKALINE DRY CELL CONTAINING A CAN OF NICKEL-PLATED STEEL HAVING AN INNER SURFACE OF GRAPHITE

BACKGROUND OF THE INVENTION

1. Field of the Invention

The present invention relates to an alkaline dry cell having an excellent performance, suitable for the recent super heavy load or a heavy load application.

2. Description of the Related Art

Recently, super heavy load discharge or a heavy load application, such as portable AV devices including personal digital assistants (PDA), CD players, MD players and liquid crystal television sets, and portable telephones has been required for an alkaline dry cell. However, conventional positive electrode cell cases of alkaline dry cells are produced by drawing a steel sheet preliminarily applied with nickel-plating on both sides, or by drawing a steel sheet and then applying nickel-plating on it.

Since the former process comprising of drawing a steel sheet preliminarily applied with nickel-plate generates cracks on the nickel-plating surface to expose the iron base, the contact resistance rises therefor The latter process comprising of drawing a steel plate and then applying nickel-plating involves a problem in that the inner surface of the cell case is poorly applied with nickel-plating although the outer surface is well applied with the nickel-plating. For example, when nickel-plating is applied on the outer surface by a 3 μm thickness, only about 0.5 μm thickness of nickel-plating is applied on the inner surface. Therefore, due to the poor contact of the inner surface with a positive electrode compound, the contact resistance is raised, as a result the short-circuit current decreases and the performance of an alkaline dry cell falls after a long term storage, furthermore generation of hydrogen gas increases.

SUMMARY OF THE INVENTION

Accordingly, one object of the present invention is to provide an alkaline dry cell suitable for the above-mentioned recent super heavy load or a heavy load application by improving the positive electrode cell case of an alkaline dry cell to obtain the high performance of a dry cell.

That is, the present invention relates to an alkaline dry cell having a cell case (acting also as a terminal) for accommodating a power generating element which is prepared by drawing a cold rolled steel material preliminarily applied with nickel-plating on both sides so as to form a can and have a conductive film in its inner surface portion contacting with a positive electrode compound, wherein the portion with the conductive film is formed in the 75% to 90% area with respect to the area of the whole portion contacting with the positive electrode compound in the inner surface portion.

As mentioned above, since the conductive film is applied in the inner surface of a can to be used as a terminal and cell case, a layer with an excellent conductivity can be obtained. Further, since the exposed iron base is covered by the conductive film even if cracks are generated on the surface at the time of drawing processing, a bad influence of cracks can be solved. Therefore, in an alkaline dry cell of the present invention, increase of the contact resistance and decrease of the short-circuit current can be prevented. If the above-mentioned conductive film formation area is less than 75%, the above-mentioned object cannot be achieved sufficiently, on the other hand, in the case of more than 90%, filler compounds rise up during the dry cell production process. Therefore the range of 75% to 90% is favorable.

BRIEF DESCRIPTION OF THE DRAWINGS

FIG. 1 is a cross-sectional view of an alkaline battery according to an embodiment of the present invention.

DESCRIPTION OF THE PREFERRED EMBODIMENTS

Examples

Figure 2:
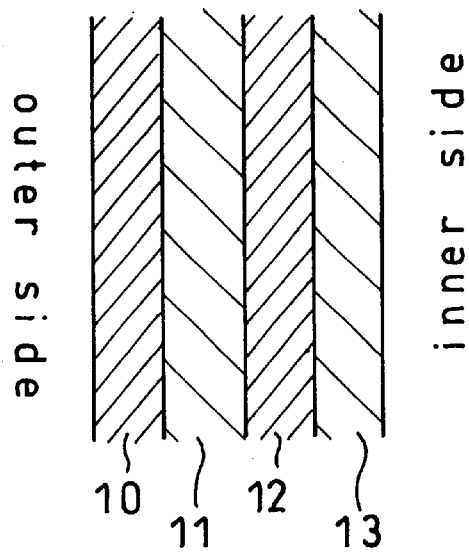
FIG. 2 is a cross-sectional schematic diagram of a positive electrode cell case of the present invention.

A JIS standard LR 6 type alkaline dry cell shown in FIG. 1 was assembled.

In this figure, numeral 1 represents a cylindrical metal can with a bottom face, which also serves as a positive electrode terminal. A positive electrode compound 2 cylindrically shaped with pressure was filled in the metal can 1. The positive electrode compound 2 was prepared by mixing manganese dioxide powders and carbon powders, accommodating the same in the metal can 1 to have a hollow cylindrical shape by applying a certain pressure. A gel negative electrode 4 was filled in the hollow portion of the positive electrode compound 2 via a cylindrical separator 3 having a bottom face comprising a non-woven fabric of acetalized polyvinyl alcohol fibers.

A brass negative electrode collecting bar 5 was inserted in the gel negative electrode 4 such that the upper end part of the collecting bar 5 projects from the gel negative electrode 4. An insulating gasket 6 comprising a double ring shape polyamide resin was provided on the projecting outer periphery surface of the negative electrode collecting bar 5 and the upper part inner periphery surface of the metal can 1. A ring shape metal plate 7 was provided between the double ring shape part of the gasket 6. A hat-like metal sealing plate 8, which serves also as a negative electrode terminal was provided to the metal plate 7 such that it contacts with the head part of the collecting bar 5. By bending the opening rim of the metal can 1 inward, the inside of the metal can 1 was tightly sealed with the gasket 6 and the metal sealing plate 8.

In the alkaline dry cell, the cylindrical metal can 1 having a bottom face, which serves also as a positive electrode terminal was produced as mentioned below.

Figure 3:
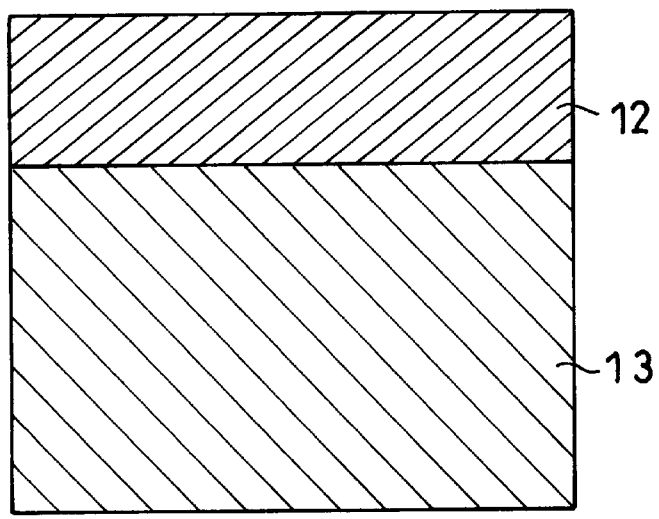
FIG. 3 is a developed view of the inner surface of a positive electrode cell case of the present invention.

A steel plate applied with nickel-plating on both sides by 2 to 3 μm was applied with drawing processing into a cylindrical shape with a bottom face. A conductive film mainly containing graphite was formed on the inner side of the metal can 1 except the portion contacting with the gasket. FIG. 2 shows a cross-sectional configuration of the metal can. In the figure, numeral 11 represents a steel plate, 10 and 12 a plating layer, and 13 a conductive film mainly containing graphite. FIG. 3 is a developed view of the metal can inner surface. The conductive film was applied as mentioned below. A conductive coating material mainly containing graphite, diluted with a low boiling point organic solvent such as methyl ethyl ketone (MEK), was sprayed to the inner surface of the metal can with a spray gun. At the time, the portion which is contacted with the gasket at the metal can opening portion was not applied with the coating. After the application with the conductive coating material with the spray gun, the solvent was evaporated with a drier. About 1 to 10 μm thickness is preferable as the remained conductive film. The area applied with the conductive film was 90% with respect to the area of the whole inner surface of the metal can contacting with the positive electrode compound.

Comparative Example 1

A can was prepared by drawing a cool rolled steel plate applied with nickel-plating on both inner and outer surfaces but without the conductive film. Using this can as a positive cell case (also as a terminal), a JIS standard LR 6 type alkaline dry cell was assembled by the same process as the above-mentioned example.

Comparative Example 2

A can was prepared by drawing a cool rolled steel plate without nickel-plating and then applying nickel-plating on surfaces but without the conductive film. Using this can as a positive cell case (also as a terminal), a JIS standard LR 6 type alkaline dry cell was assembled by the same process as the above-mentioned example.

The open circuit voltage (average of n=100 pieces), the short-circuit current (average of n=100 pieces) and the hydrogen gas amount [the gas inside the dry cell was collected by disassembling in water] (average of n=100 pieces) of the each above alkaline dry cell were examined after storing at 60° C. for 10 days and 60 days. Results are shown in Table 1.

TABLE 1

| 60° C. storage | Open circuit voltage | | Short-circuit current | | Hydrogen gas amount | |
|---|---|---|---|---|---|---|
| | after 10 days | after 60 days | after 10 days | after 60 days | after 10 days | after 60 days |
| Example | 1.611 | 1.597 | 14.0 | 13.1 | 0.35 | 0.53 |
| comparative Example 1 | 1.610 | 1.586 | 10.1 | 8.0 | 0.37 | 0.82 |
| comparative Example 2 | 1.610 | 1.584 | 9.9 | 7.2 | 0.39 | 1.23 |

Compared with Example, deterioration of the short-circuit current was more conspicuous in Comparative Example 1 already after 10 days storage at 60° C. Also the difference in hydrogen gas amount was conspicuous after 60 days storage at 60° C. In the comparison of Example and Comparative Example 2, the difference was more conspicuous than the case of Comparative Example 1, so that it was confirmed the nickel-plating after drawing is disadvantageous.

The difference in the dry cell performance caused by the conductive film area was examined. As shown in Table 2, the open circuit voltage (average of n=100 pieces) and the short-circuit current (average of n=100 pieces) at the initial stage and after storing at 60° C. for 60 days, and the hydrogen gas amount [the gas inside the dry cell was collected by disassembling in water] (average of n=100 pieces) at 60° C. for 10 days and 60 days of the alkaline dry cell of the above-mentioned example (conductive film application area 90%) and the alkaline dry cells with the conductive film application area of 85%, 80%, 75%, 70%, 50%, and 30% were examined after storing. Results are shown in Table 2.

TABLE 2

| application area | Open circuit voltage | | Short-circuit current | | Hydrogen gas amount | |
|---|---|---|---|---|---|---|
| | initial stage | after 60 days | initial stage | after 60 days | initial stage | after 60 days |
| 90% | 1.615 | 1.597 | 14.6 | 13.1 | 0.35 | 0.53 |
| 85% | 1.615 | 1.595 | 14.6 | 12.7 | 0.35 | 0.55 |
| 80% | 1.615 | 1.594 | 14.6 | 12.3 | 0.35 | 0.56 |
| 75% | 1.615 | 1.592 | 14.5 | 11.2 | 0.36 | 0.58 |
| 70% | 1.614 | 1.589 | 14.5 | 10.1 | 0.36 | 0.63 |
| 50% | 1.614 | 1.587 | 14.5 | 9.7 | 0.36 | 0.71 |
| 30% | 1.614 | 1.585 | 14.4 | 8.8 | 0.38 | 0.78 |

From the results shown in table 2, it was confirmed that deterioration after storage becomes larger with a smaller application area of less than 70%. Furthermore, a 70% or less application area is not appropriate since the open circuit voltage becomes less than 1.590 V, the short-circuit current less than 10 A, and the gas amount of more than 0.60 cc. Therefore, at least 75% application area is necessary. On the other hand, with a 100% application amount, the filler compound becomes separated in the dry cell production process. Therefore, a slight metal surface area is necessary and thus the application amount up to 90% is appropriate.

As heretofore mentioned, according to an alkaline dry cell of the present invention, by the improvement of the positive electrode cell case, the increase of the contact resistance can be prevented so as to improve the short-circuit current. Therefore, the present invention can provide an alkaline dry cell having an excellent performance appropriate for the recent super heavy load or a heavy load application.

What is claimed is:

1. An alkaline dry cell comprising
   a steel can having an inner surface comprising nickel;
   a positive electrode compound inside the can; and
   a conductive film on the inner surface and in contact with the positive electrode compound, wherein
   the conductive film consists essentially of graphite.

2. The alkaline dry cell according to claim 1, wherein a thickness of the conductive film is about 1 to 10 μm.

3. The alkaline dry cell according to claim 1, wherein the conductive film separates 75% to 90% of the inner surface of the can from the positive electrode compound.

4. A method of manufacturing an alkaline dry cell, the method comprising coating graphite on an inner surface of a cell case, and forming the alkaline dry cell of claim 1.

5. The method according to claim 4, wherein the coating comprises spraying graphite onto the inner surface of the cell case.

6. A method of powering an electrical device, the method comprising discharging the alkaline dry cell of claim 1.

7. An alkaline dry cell comprising a steel can having an inner surface comprising nickel; a positive electrode compound inside the can; and a conductive film on the inner surface and in contact with the positive electrode compound, wherein the conductive film consists of graphite.

8. The alkaline dry cell according to claim 7, wherein a thickness of the conductive film is about 1 to 10 μm.

9. The alkaline dry cell according to claim 7, wherein the conductive film separates 75% to 90% of the inner surface of the can from the positive electrode compound.

10. A method of manufacturing an alkaline dry cell, the method comprising coating graphite on an inner surface of a cell case, and forming the alkaline dry cell of claim 7.

11. The method according to claim 10, wherein the coating comprises spraying graphite onto the inner surface of the cell case.

12. A method of powering an electrical device, the method comprising discharging the alkaline dry cell of claim 7.

* * * * *